United States Patent
Romes et al.

[11] Patent Number: 5,631,875
[45] Date of Patent: May 20, 1997

[54] DEVICE FOR MEASURING DISTANCE WITH ULTRASOUND

[75] Inventors: Roman Romes, Friolzheim; Karl-Heinz Dambacher, Reutlingen, both of Germany

[73] Assignee: Robert Bosch GmbH, Stuttgart, Germany

[21] Appl. No.: 618,512

[22] Filed: Mar. 19, 1996

Related U.S. Application Data

[63] Continuation-in-part of Ser. No. 308,843, Sep. 19, 1994, abandoned, which is a continuation of Ser. No. 64,177, Aug. 2, 1993, abandoned.

[30] Foreign Application Priority Data

Nov. 11, 1991 [DE] Germany ............. 41 36 958.0
Mar. 18, 1992 [DE] Germany ............. 42 08 595.0

[51] Int. Cl.⁶ .................... G01S 15/00; G01S 7/52
[52] U.S. Cl. .................................. 367/99; 367/98
[58] Field of Search ..................... 367/98, 99, 85, 367/95, 97, 908

[56] References Cited

U.S. PATENT DOCUMENTS 4,905,208  2/1990  Dick .......................................... 367/99
4,975,889  12/1990  Petrucelli et al. ...................... 367/98
5,077,701  12/1991  Lill ........................................... 367/98
5,150,334  9/1992  Crosby ..................................... 367/98

FOREIGN PATENT DOCUMENTS 8303478  10/1983  WIPO .

OTHER PUBLICATIONS

Crow, S., "Comparator With Adaptive Minimum Threshold", IBM Technical Disclosure Bulletin, vol. 18, #10, Mar. 1976, pp. 3210–3212.

*Primary Examiner*—Ian J. Lobo
*Attorney, Agent, or Firm*—Michael J. Striker

[57] ABSTRACT

A device for the measurement of distance with ultrasound is provided in which a transmitter emits a pulse-type signal which is reflected and is converted into an electrical echo signal in a receiver. The distance between transmitter and receiver is determined by measuring the transit time between the emitted and the received signal. Since the level of the echo signal as a function of the emitted signal depends on the characteristics of the reflector and on the distance between transmitter and receiver, inaccuracies may occur in the evaluation of the echo signal and these are avoided by varying a switching threshold or by varying the amplification of the echo signal or by modifying the radiated signal as a function of the previously received echo signal.

14 Claims, 8 Drawing Sheets

DEVICE FOR MEASURING DISTANCE WITH ULTRASOUND

CROSS-REFERENCE TO RELATED APPLICATION

This application is a continuation-in-part of application Ser. No. 08/308,843, filed on Sep. 19, 1994 now abandoned, which is a continuation of application Ser. No. 08/064,177, filed Aug. 2, 1993, now abandoned.

BACKGROUND OF THE INVENTION

The invention related to a device for the contactless measurement of distance with ultrasound.

It is known to perform contactless measurements of distance with the aid of ultrasound transit-time measurements. In connection with device for warning of a collision in the case of motor vehicles, such as those known from the as yet unpublished patent application P 41 20 697, a short ultrasound signal is emitted by a sound transducer and, if an obstacle (reflector) is present, it is reflected by the latter and received by the sound transducer again. From the transit time, the distance between the sound transducer and the reflecting obstacle is calculated.

Since the level of the reflected signal depends not only on the level of the signal emitted but also on the distance between the ultrasound transducer and the reflector and on the quality of the reflector, problems arise in the evaluation of the echo signal.

One way of using the echo signal to generate a time marker is to compare the echo signal with a switching threshold in a threshold-value switch so that a signal is produced at the output of the threshold-value switch if the echo signal exceeds the threshold.

The level of the switching threshold must be fixed in such a way that, on the one hand, it is high enough to suppress unwanted extraneous echoes but, at the same time, it should also exceed the switching threshold in the case of a strongly absorbing reflector of the echo signal since no indication is otherwise possible.

SUMMARY OF THE INVENTION

It is an object of the present invention to provide a device for measuring distance with ultrasound which does not have the disadvantages described above.

Compared with the known devices, the device according to the invention has the advantage that either a fixed switching threshold is not used but a switching threshold whose level can be varied as a function of the echo signals to be registered and processed or of the preceding echo signals, or that the amplification of the echo signals can be varied as a function of the preceding echo signals to be registered and processed by corresponding means.

In a further advantageous embodiment of the invention, the level of the echo signal is kept approximately constant by varying the intensity of the emitted signal as a function of the echo signals previously received and consequently it can be compared with a fixed threshold value.

The modification of the intensity of the emitted signal is achieved by exciting the ultrasound transducer for evaluating the pulses for a variable time, this time, which is referred to as gating time, being determined on the basis of the following considerations:

Since the ultrasound signals emitted are generally short pulse packets having approximately 4 to 6 maxima and equally as many minima, and since the envelope curve of the echo signal generally has the same envelope curve shape as the emitted signal, it is possible to obtain a criterion for the necessary variation in the switching threshold or of the gain by evaluating the envelope curve shape. In this respect, the necessary variation is advantageously determined by measuring a particular time which depends on the intensity, a first method being to ensure the time between the first transgression of the switching threshold by the echo signal and the last transgression. This time is dependent on the level of the echo signal and can therefore be used particularly advantageously for threshold variation.

Since the gating time cannot be made indefinitely short, the output signal of the ultrasound transducer, that is to say the emitted signal, cannot be attenuated indefinitely. A particularly strong attenuation of the output signal can be obtained by fixing two short gating times whose spacing is suitable chosen if the excitation performed in the second gating time compensates, at least partly, for the excitation performed during the first gating time, it thereby being possible to achieve, advantageously, a range extension in the direction of reducing the emitted signal.

BRIEF DESCRIPTION OF THE DRAWINGS

The objects, features and advantages of the present invention will now be illustrated in more detail by the following detailed description, reference being made to the accompanying drawing, in which.

DESCRIPTION OF THE PREFERRED EMBODIMENTS

In FIGS. 1a to d, 10 denotes the ultrasound transducer which generates the emitted signals S1 which reach the reflector 11 and reflected from it and reach the ultrasound transducer 10 against echo signal S3.

Figure 2:
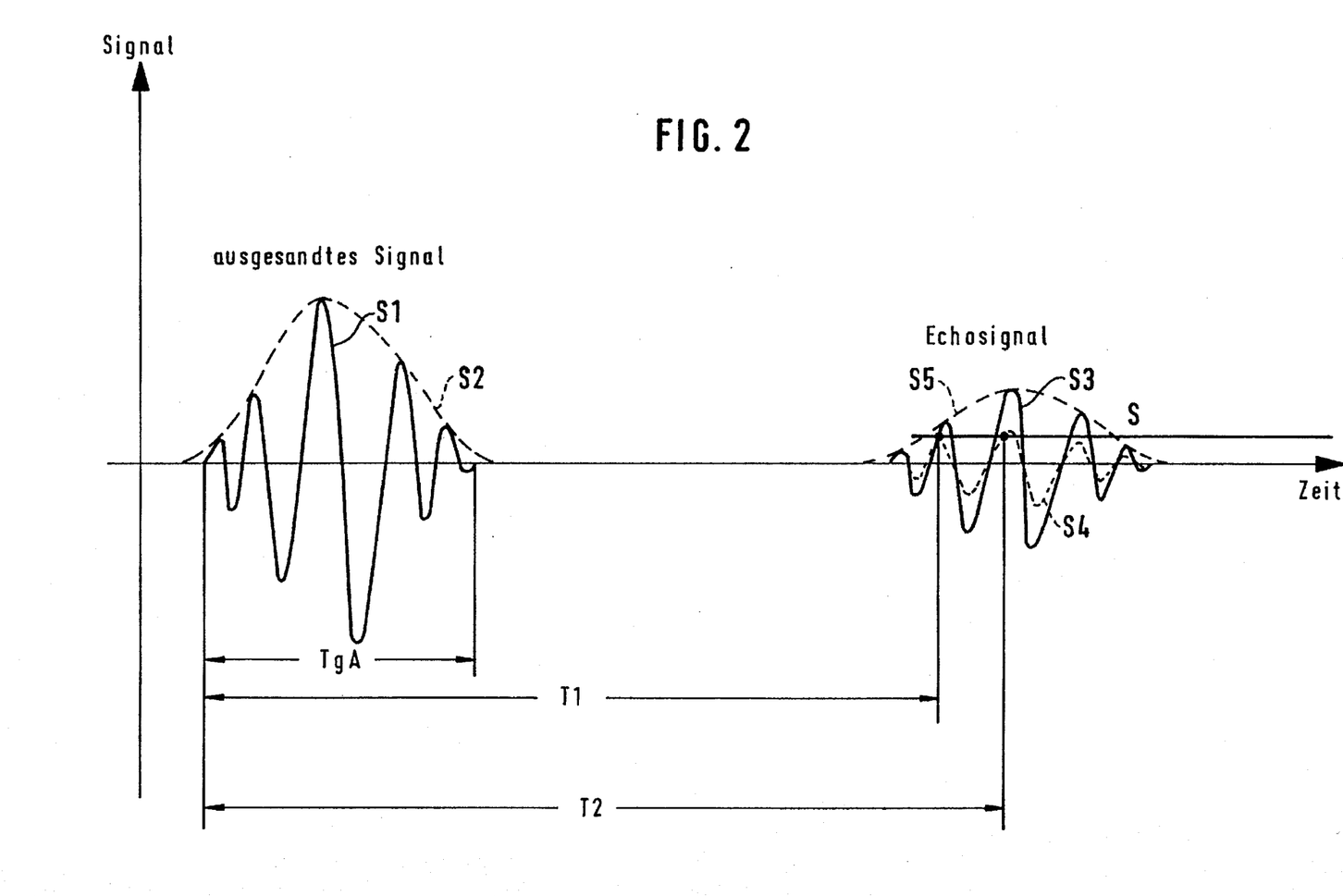
FIG. 2 is a graphical illustration of the relationship of emitted signal strength and the received echo signal strength on time.

The signals S1 as well as the echo signals S3 are pulse signals. They are illustrated in FIG. 2.

In the ultrasound transducer 10, the echo signals are converted into electrical signals S10 which are evaluated in the microcomputer 14 of a downstream evaluation device 12 in order to determine the distance a between the ultrasound transducer 10 and the reflector 11. The design of the evaluation device 12 varies with the principle of evaluation. The embodiment of FIG. 1a has a threshold value switch 13 as an important component. The echo signal S3 is fed to its non-inverting input (+) while a variable threshold value is applied at its inverting input (−) and forms a variable switching threshold.

Figure 1A:
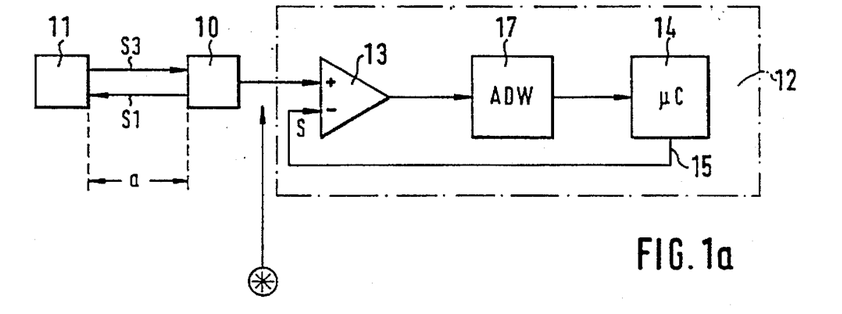
FIG. 1a is a block diagram of a first embodiment of a device for measuring distance with ultrasound according to the invention.

The output of the threshold value switch 13 is connected via an A/D converter 17 to a microcomputer 14 which is able to modify via a line 15 the threshold value S applied to the inverting input of the threshold value switch 13. The modification of this threshold S is performed by the microcomputer which continuously contains the output signals of the threshold value switch 13 digitalized via the A/D converter. The microcomputer 14 determines from preceding output signals of the threshold value switch 13 the corresponding threshold value level for the next evaluation. Since the output signals of the threshold value switch are dependent on the electrical signals S10 of the ultrasound transducer and thereby on the reflecting signals, it can be generally assumed that the next threshold value level is determined from the preceding output signals. In which manner these determinations are performed and which signal components are exactly evaluated for determination of the next threshold value will now be explained. At the beginning of each measurement, the microcomputer 14 provides a suitable starting value, for example available in a memory.

Figure 1B:
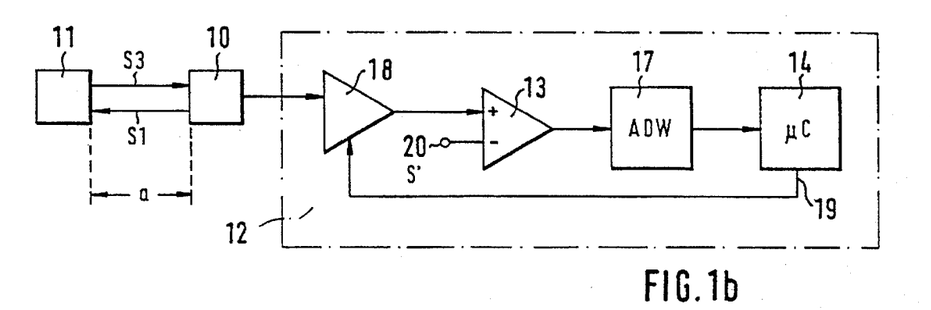
FIG. 1b is a block diagram of a second embodiment of a device for measuring distance with ultrasound according to the invention.
Figure 1C:
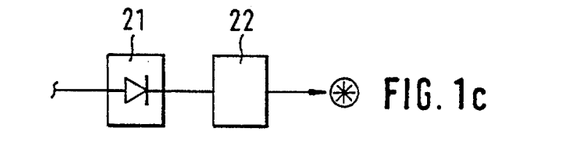
FIG. 1c is a block diagram of additional elements of the devices shown in FIGS. 1a and 1b.

FIG. 1b shows an embodiment example in which a controllable amplifier 18 is arranged upstream of the threshold value switch 13. Its gain factor is determined by the microcomputer 14 through a line 19 in dependence on the previously registered signals. The gain factor is adjusted so that a signal generated at the output of the amplifier 18 with respect to its maximum amplitude is independent from the level of the signal S10 at the input of the controllable amplifier 18 and is substantially constant. The output signal of the controllable amplifier 18 is then supplied to the non-inverting input of the threshold value switch 13 and there is compared with the constant threshold value S1 applied to the inverting input.

A determination of the gain factor of the controllable amplifier 18 is performed by the microcomputer 14 in dependence on the preceding output signals of the threshold value switch. At the beginning of each measurement the microcomputer 14 determines a predetermined gain factor which is supplied to the controllable amplifier 18. This gain factor during each further measuring step is changeably adjusted in dependence on the preceding signal with reference to the signal to the signal value. The exact procedure corresponds substantially to the adjustment of the threshold value in the embodiment example of FIG. 1 and described in more detail in the further description. The microcomputer 14 includes the required means which makes possible a computation of the next threshold value or the next gain factor in dependence on the preceding output signals of the threshold value signal 13 and thereby generally in dependence on the preceding signals.

In FIG. 2, the emitted signal S1 and the echo signal S3 are plotted against the time T. It can be seen that the emitted signal S1 comprises a pulse packet with a plurality of maxima and minima, and the pulse distribution has a bell-shaped envelope curve and identified with S2.

If a signal S1 is emitted by the ultrasound transducer 10, it is supplied to the hindrance or the reflector 11 and after a time ½T1 is reflected by the reflector 11 located at a distance a from the ultrasound transducer 10. After a further time ½ T1, the reflected signal reaches again the ultrasound transducer and results after a time T1 after the sensing in an echo signal S3 with shape and envelope curve largely corresponding to the shape and the envelope curve of the signal S1, but they are attenuated in their level.

Depending on the type of reflector 11 and on the distance between the ultrasound transducer and reflector, the received echo signal S3 has a relatively high amplitude or, in the event of poor reflection, a relatively low amplitude, the echo signal with low amplitude being denoted by S4 in FIG. 2. The envelope curve S5 which is plotted for the echo signal S3 in FIG. 2 is again bell-shaped, as already mentioned.

From the spacing in time between emitted signal and echo signal it is possible to determine the distance between the ultrasound transducer 10 and the reflector 11 if the propagation velocity of ultrasound is known, but it is necessary to define this distance unambiguously, taking account of very different echo signal levels.

To fix the time T1 between emitted signal S1 and echo signal S3, the echo signal is fed to the threshold-value switch 13, which has a switching threshold S and which, whenever the echo signal exceeds the switching threshold, emits an output signal which is digitized in the A/D converter 17 and evaluated in the microcomputer.

The time interval between the start of the emitted signal S1 and the first transgression of the switching threshold by the echo signal S3 is measured in the microcomputer and is then used to determine the distance between the ultrasound transducer 10 and the reflector 11, it being evident from FIG. 2 that, for a high echo signal S3, this time is equal to T1 and; for a lower echo signal and the same switching threshold S, it is equal to T2 since in that case even the second positive half-wave of the echo signal cannot exceed the switching threshold S but only the third positive half-wave.

So that these various times T1 and T2 do not result in an incorrect measurement, the switching threshold is varied as a function of the preceding echo signal in the exemplary embodiment shown in FIG. 1. One way in which this variation can be implemented can be explained by reference to FIG. 3.

Figure 3:
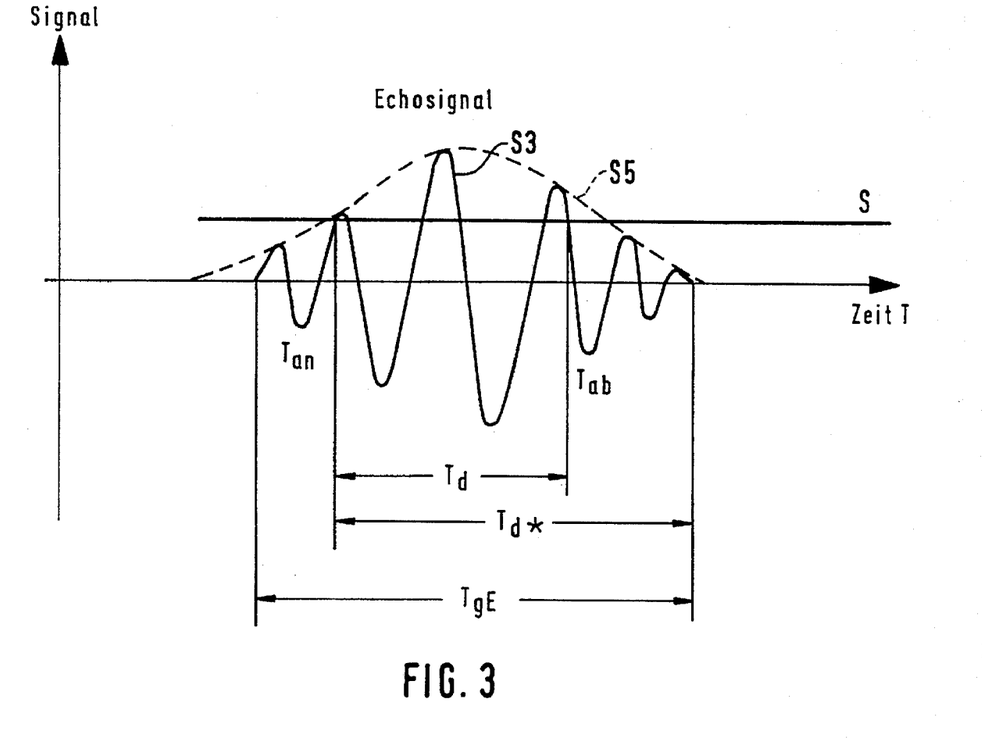
FIG. 3 is a graphical illustration of the variation of the echo signal with time.

In FIG. 3, the echo signal is plotted against time T and also the switching threshold S. The first transgression of the switching threshold S by the signal S3 is denoted as $T_{an}$ and the last transgression by $T_{ab}$. The difference between $T_{ab}$ and $T_{an}$ is denoted as $T_d$ and the difference between the disappearance of the signal S3 and the time $T_{an}$ is denoted as time interval $T_{d*}$. The total time between the absolute start of the echo signal S3 and its absolute end is determined by the time interval $T_B$.

The difference $T_d$ between the two times $T_{ab}$ and $T_{an}$ may be used as a criterion for the relative position of the switching threshold for the instantaneous magnitude of the echo signal. In the case of a rather low echo signal, only the central, and consequently the largest, maximum would exceed the switching threshold, and the front of the maximum would then determine $T_{an}$ and the trailing edge would determine $T_{ab}$. The consequence would be a substantially shorter time difference $T_d$ than in the case of the example shown in FIG. 3.

For a still lower echo signal, the switching threshold is no longer reached or exceeded at all and a time difference $T_d$ can then no longer be determined.

With an increased echo signal, the time duration $T_d$ may increase almost to the total duration $T_B$ of the echo since in that case already the first and even the last maximum may exceed the switching threshold. It is consequently evident that the differential time $T_d$ is a criterion for suitably matching the switching threshold to the echo signal to be registered, it being necessary to make a separate arrangement for the case where $T_d$ cannot be determined.

The differential time $T_d$ is converted into a processable signal, for example a direct voltage, with the aid of the microcomputer 14, as is also described later, and makes possible a particularly simple displacement of the switching threshold S, a control or threshold displacement being provided in such a way that the time $T_d$ remains approximately constant as a consequence of the threshold displacement. The time marker $T_{an}$ also consequently becomes independent of the magnitude of the echo signal S3, even weak echoes being detected and the time marker always appearing at the same point in the wave train of the signal S3.

Instead of the differential time $T_d$, the differential time $T_{d*}$ can also be used to modify the switching threshold since this time duration is also a criterion for the relative position of the switching threshold for the instantaneous magnitude of the echo signal.

In addition to modifying the switching threshold with the aid of a direct voltage generated from the differential time $T_d$ or the differential time $T_{d*}$, the amplification of the echo signal may also be varied and in that case an evaluation device 12 as shown in FIG. 1b should be provided.

Additionally disposed between the ultrasound transducer 10 and the threshold-value switch 13 in the evaluation device 12 shown in FIG. 1b is a controllable amplifier 18, whose gain factor can be varied by the microprocessor 14 via a line 19.

The microprocessor 14 evaluates the output signals of the threshold value switch 13 and determines from the threshold value excess as during the evaluation according to FIG. 1a, the differential times $T_d$ and/or $T_{d*}$ (see FIG. 3). Independent of the preceding differential time $T_d$ or $T_{d*}$ the actual gain factor is determined by the microprocessor and supplied to the amplifier.

Since a controlled output voltage of the amplifier 18 is fed to the threshold-value switch 13, the switching threshold S' can remain fixed and the time marker $T_{an}$ remains, nevertheless, independent of the echo signal registered before the amplification. The time T1 is consequently also independent of the level of the echo signal, and thereby the distance measurement is determinable independently of the level of the echo signal.

A further way of utilizing the differential time $T_d$ or of utilizing $T_{d*}$ to modify the switching threshold S or the gain factor K is explained by reference to the diagram, shown in FIGS. 5 and 6, for an ultrasound transducer 10, whose design is roughly sketched in FIG. 7. In this connection, it is essential for the ultrasound transducer 10 to have a vibratory membrane 23 which is caused to vibrate by means of an oscillator 24, which oscillates at an ultrasound frequency, for predeterminable times, for example for a time T3 and, in doing so, provides ultrasound pulses which ultimately correspond to the emitted signals S1.

As long as the amplitude of the vibrating membrane exceeds a predeterminable threshold-value, a measurement signal is enabled. The measurement signal is plotted against the time T as signal CH1 in FIG. 5.

Since the membrane reverberates, no echo can be received during the reverberation time. The echo itself enables the measurement signal after the time duration T1. The membrane, now acting as a receiver, vibrates for as long as the predeterminable threshold value continues to be exceeded and the measurement signal also continues to be enabled. The time during which the measurement signal is enabled is the time $T_d$. The control of the time $T_d$, i.e. keeping it constant, is now done by modifying the transmission intensity.

Figure 4:
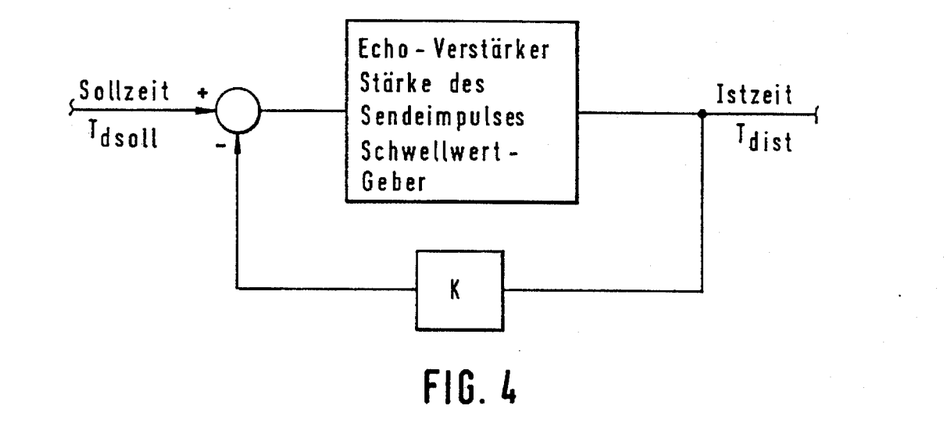
FIG. 4 is a block diagram illustrating the device for setting of the threshold value S of the threshold value switch.

FIG. 4 illustrates once more the three possible measures with whose aid the time marker $T_{an}$ is rendered independent of the echo signal level. Here a set point time $T_{dsoll}$ is predetermined, and an actual time $T_{dist}$ is measured and compared with the setpoint time $T_{dsoll}$. The gain factor K of the amplifier 18 is increased or reduced depending on the result of the comparison, and the threshold value S of the threshold-value switch 13 or the level of the transmission pulse is varied.

The following possibilities can be used to determine the differential time $T_d$:

1. In the microprocessor 14, the number of switching threshold transgressions by the echo signal S3 is counted, and depending on this number, the microprocessor then modifies the trigger threshold in a suitable way or varies the gain for the amplifier 18. In this connection, in the case of a fairly large number of switching threshold transgressions, which indicates a high echo signal, either the switching threshold S is increased or the gain factor K of the amplifier 18 is reduced.

Both measures have the effect that a suitable number of transgressions, for example 3, occurs, regardless of the actual level of the echo signal S3.

A further way of determining the time $T_d$ or obtaining a signal which is dependent on $T_d$ is for the echo signal to be rectified and filtered so that the envelope curve of the echo signal is obtained. For this purpose, the echo signal is fed from the ultrasound transducer 10 to the threshold-value stage 13 or to the controllable amplifier 18 via a rectifier 21 and a filter 22, for example a band-pass filter. The circuit arrangement shown in FIG. 1a is in that case supplemented by the arrangement shown in FIG. 1c.

Figure 1D:
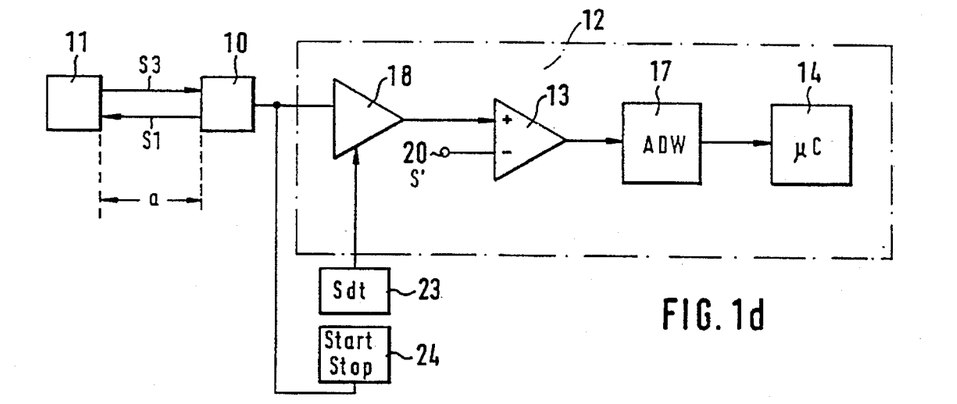
FIG. 1d is a block diagram of a third embodiment of a device for measuring distance with ultrasound according to the invention.

If, furthermore, a switching threshold starts, via a start and stop electronic system 24, an integrator 23 which is stopped again on falling below said switching threshold, a direct voltage which is proportional to the time for which the integrator 23 was switched on is obtained as an integrated signal. This direct voltage can be used to modify the gain of the amplifier 18. The circuit arrangement associated with this determination of the time $T_d$ is shown in FIG. 1d.

The gain can be therefore modified without control by the microprocessor 14. It is possible to modify the gain of the amplifier 18 in dependence on the previously registered output signals of the threshold value switch. However, it is also possible to perform an adjustment of the transmission power, or in other words, the intensity of the ultrasound pulse emitted by the ultrasound transducer 10.

When the start-stop electronic circuit has its own threshold value switch, then the signal S10 can also be supplied to the start-stop electronic circuit. Then, the adjustment of the gain and/or intensity of the emitted ultrasound pulse can be performed independently of the previously registered signals. Since alternative solutions are possible, the arrows in FIG. 1d are shown in broken lines.

Figure 5:
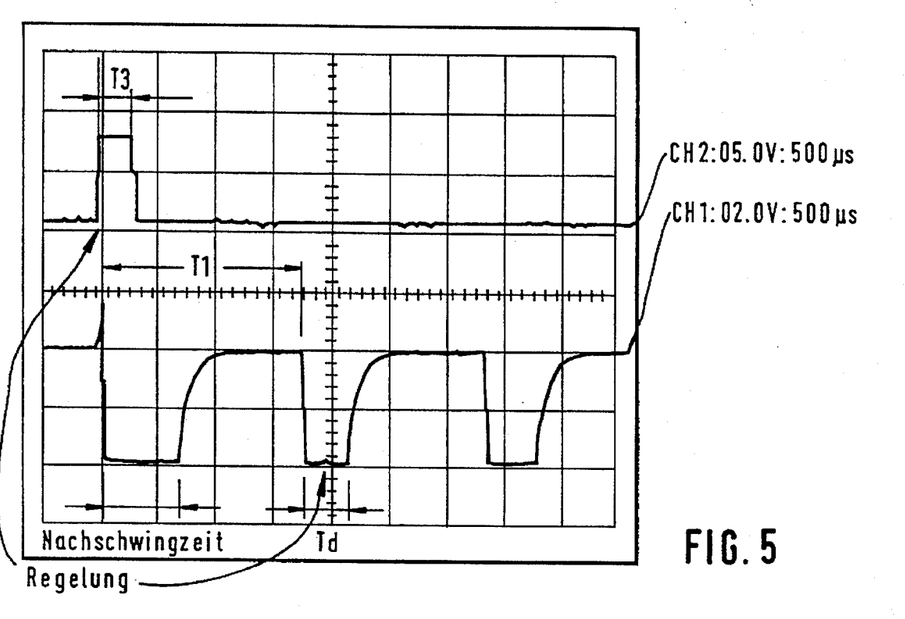
FIGS. 5 and 6 are two oscilllograms showing results of measurements used for evaluation of a vibrating membrane for producing ultrasound.
Figure 6:
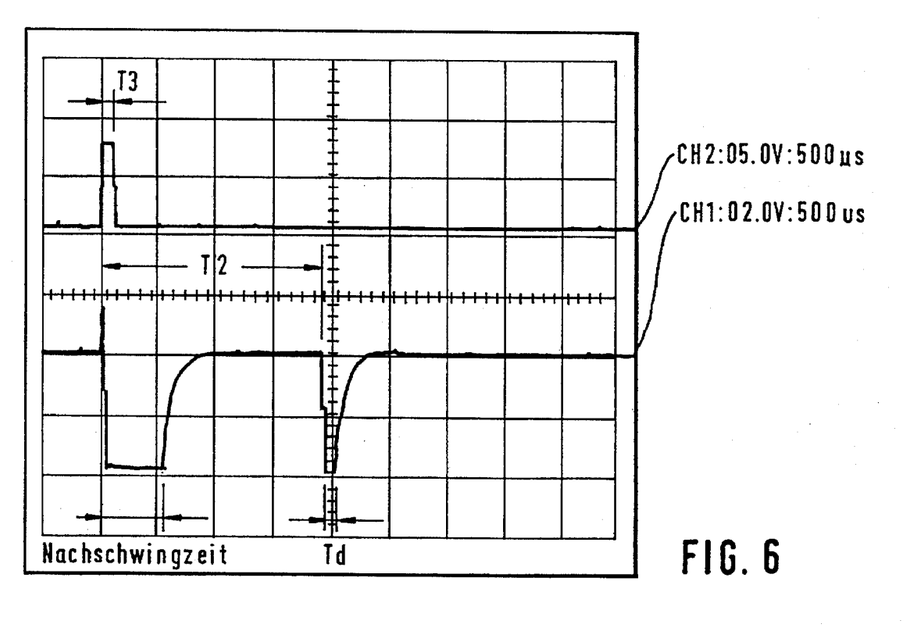

In the case of the signal distribution shown in FIG. 5, a chosen transmission time is so long that even secondary echoes are received. FIG. 6 shows an example in which the transmission time has been shortened by changing the setpoint value, a short time $T_d$ then being set so that the second echo no longer exceeds this threshold. The pulse transmit time T6 measured in this case and shown in FIG. 6 is longer than the pulse transit time T1 with the threshold value shown in FIG. 5.

In a further exemplary embodiment of the invention, which relates to the possibility of changing the emitted signal S1 as a function of the preceding echo signal S3, the oscillator signal in the ultrasound transducer 10 is relayed only at certain times. In this case, the oscillator is always oscillating and the relaying of the oscillator signal is made possible with the aid of a gating pulse, relaying taking place only for the duration of the gating pulse. The length of said gating pulse $T_I$ governs the length $T_{BA}$ of the emitted signal S1, but it also governs the amplitude of the emitted signal S1. At the same time, the amplitude increases with increasing length of the gating pulse, but beyond a certain length of the gating pulse the amplitude remains constant and it can therefore no longer be increased by prolonging the gating time.

The minimum amplitude is obtained if the chosen gating pulse is very short so that the oscillator also applies only a very short pulse to the membrane. Since the gating pulse cannot be made indefinitely short, the signal emitted by the ultrasound transducer can also not be indefinitely varied in the direction of minimum intensity so that the emitted signal can be varied in total only within a certain range.

In this exemplary embodiment of the invention, an increase in this variable range in the direction of still lower intensities of the signal to be emitted is achieved by driving the ultrasound transducer with two separate gating pulses, the spacing of said gating pulses being chosen in such a way that the second pulse has an attenuating effect in relation to the first pulse.

If the evaluation of the echo signal reveals that an emitted signal is necessary whose amplitude can no longer be reduced any further by shortening the gating pulse, a further reduction in the amplitude can be achieved by applying two short gating pulses. The echo signals are evaluated and the pulses determined in µC 14.

To clarify the relations, the following may be noted: if the ultrasound sensor is regarded as a linear time-independent system (LTI system), its behavior with time may be characterized by the following statements: with a drive pulse $U_a(\tau)$ as input function and the echo $U_a(\tau)$, which corresponds to the signal S3, as output function, the echo which occurs is the result of convolution of the input function with the Green function G(T) of the linear time-independent system. This can be represented by the following function:

$$U_a(T) = U_a(T-\tau) \times G(\tau) d$$

If the short gating pulses are interpreted approximately as a δ-function, the response of the system to a short input pulse is known to become the Green function. For two consecutive gating pulses, the convolution signal then becomes a sum in which two Green functions, which are each part of a δ-pulse, are added in a time-displaced manner. When this happens, an amplification of the transmission pulse or, alternatively, an attenuation of it occurs, depending on the choice of the spacing of the gating pulses.

With the aid of a suitable spacing, an attenuation can therefore be achieved for the purpose of reducing the transmission intensity and suitable spacings can be determined experimentally or by calculation, the calculations being carried out, for example, in the computer device 14.

Both measurements and simulations have been carried out in laboratory trials. In these, very good agreement was obtained between simulation and measurement and it has consequently been demonstrated that the system can be treated as a linear time-independent system (LTI system) to a good approximation.

Figure 7:
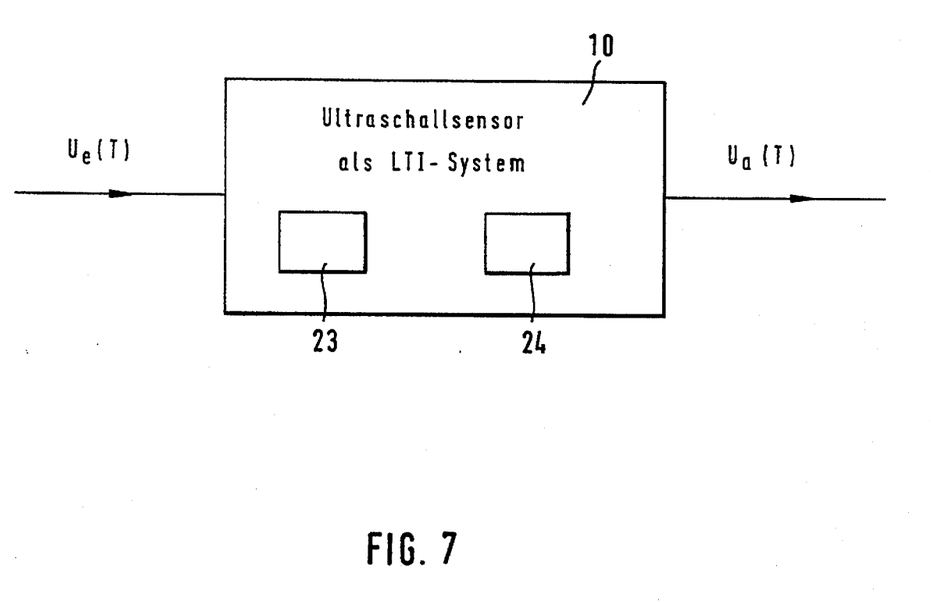
FIG. 7 is a diagrammatic illustration of an ultrasonic transducer in another embodiment of the device according to the invention.
Figures 8A, 8C:
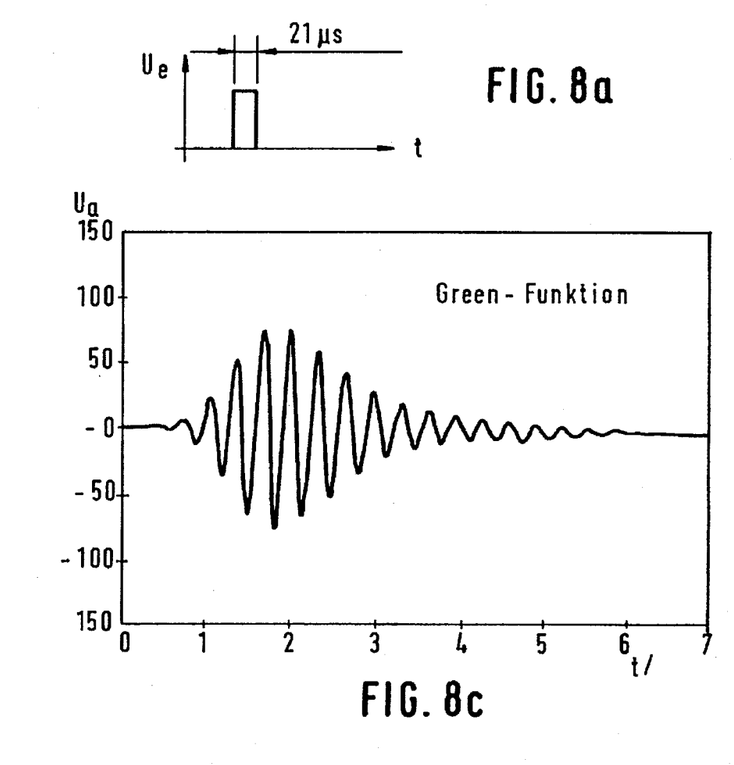
FIGS. 8a–8i show three examples of emitted signals generated by ultrasonic transducer for various pulse-type excitations, with gating, measured and calculated signals being shown.
Figure 8B:
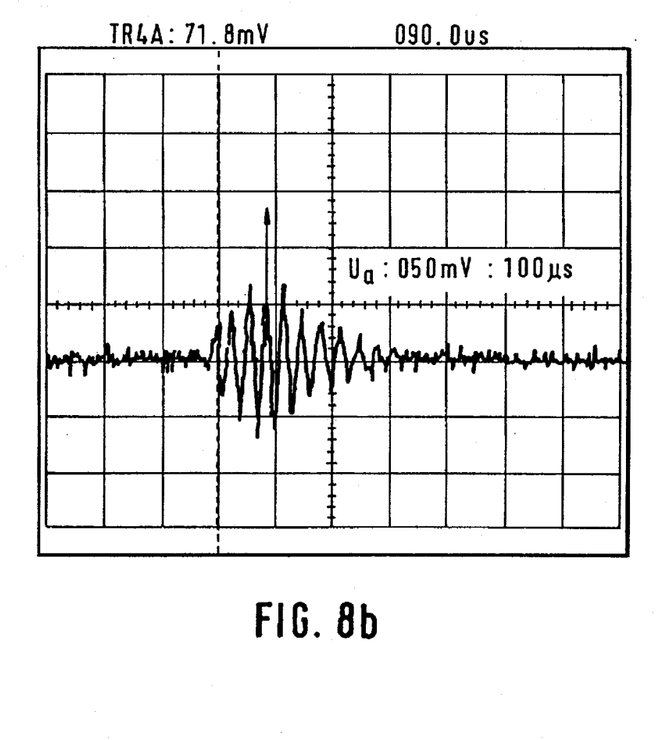
Figure 8D:
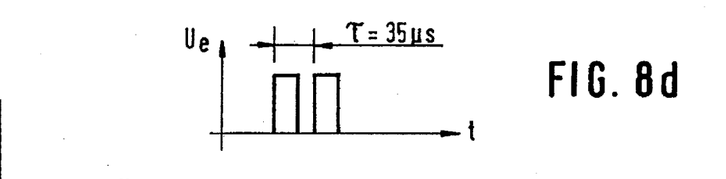
Figure 8E:
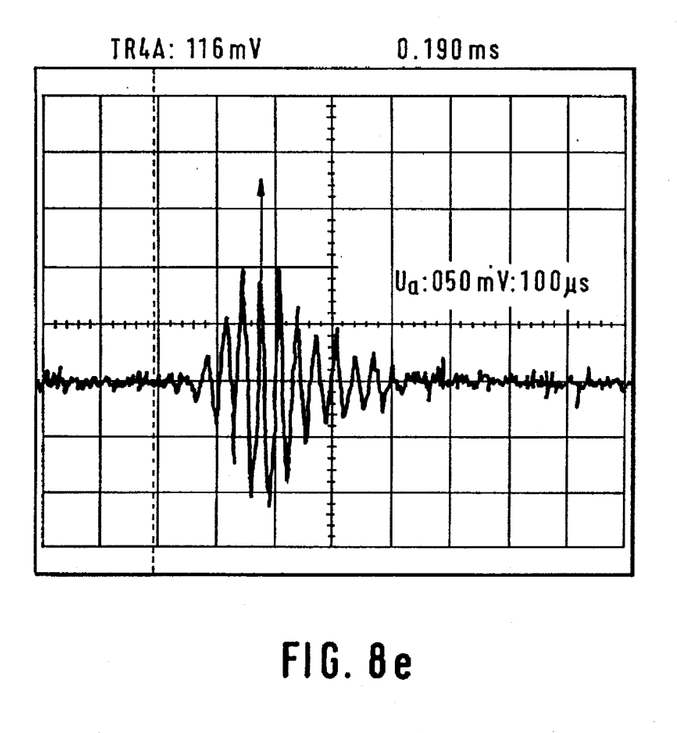
Figure 8F:
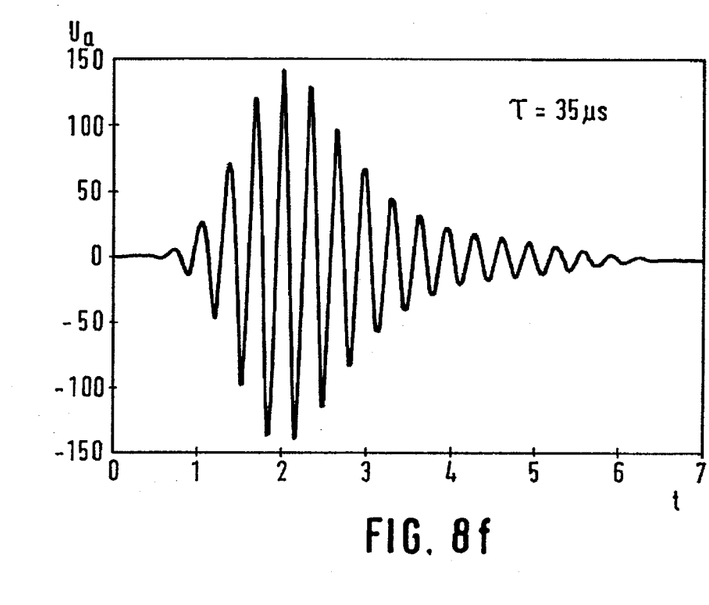
Figure 8G:
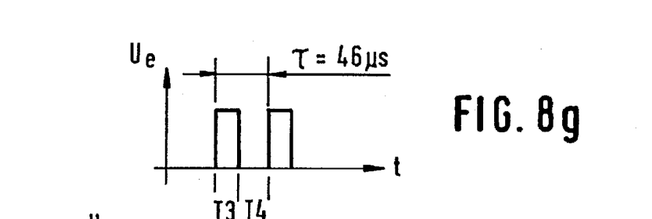

Incidentally, FIG. 7 shows diagrammatically an ultrasound sensor to which input pulses $U_a(\tau)$ are fed whose duration is equal to T3 and whose spacing, as can be seen from FIG. 8g, corresponds to T4. In this case, the output voltage $U_a(T)$ appears at the output of the ultrasound sensor.

The variation in the signals is shown in FIG. 8, and in these figures the signal variation which occurs after excitation with gating pulses is indicated for three examples, the gating pulses being plotted in FIGS. 8a, d and g, the measured signals being plotted in FIGS. 8b, e and h and the calculated signals being plotted in FIGS. c, f and i.

Excitation with a single gating pulse of as short duration as possible, as shown in FIG. 8a, produces the intensity distribution shown in FIG. 8b. This distribution corresponds approximately to the Green function of the LSI system determined by calculation and shown in FIG. 8c.

The impulse distribution shown in FIG. 8d produces an increase intensity which can be determined both experimentally and by calculation and is shown in FIGS. 8e, 8f.

Figure 8H:
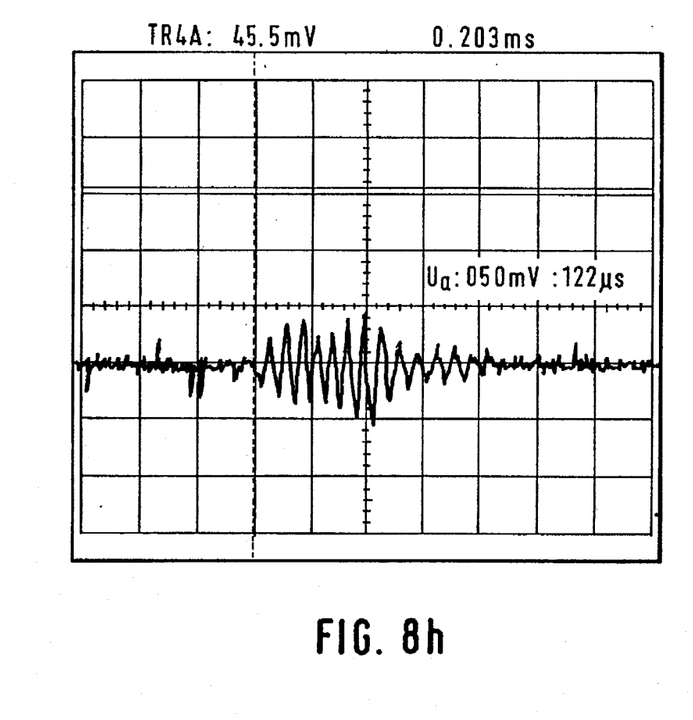
Figure 8I:
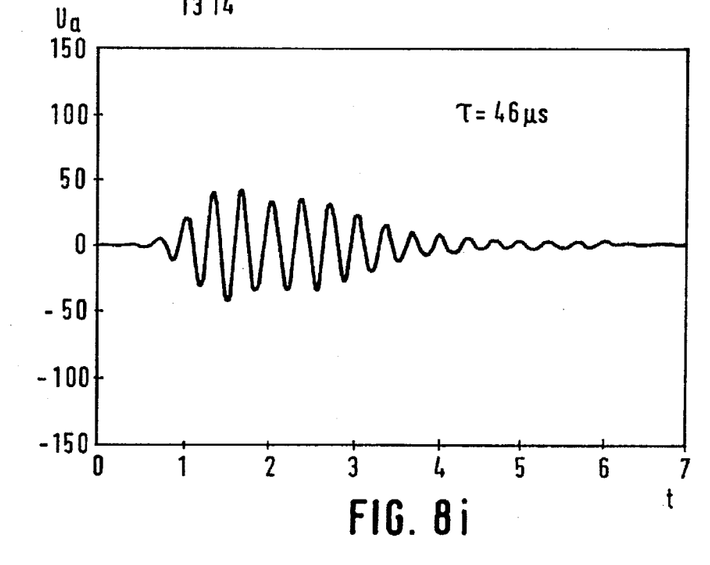

The pulse distribution, or the choice of the spacing of the gating times shown in FIG. 8g produces an attenuation of the intensities and the associated distributions are shown in FIGS. 8h, 8i.

If the maximum amplitude is considered as a function of the spacing T4 between the gating pulses, a periodic alternation between amplification and attenuation results and a further range in the signal modification can consequently be produced by suitable choice of the spacing. T4, the attenuation range mainly being exploited according to the invention since the amplification range can also be achieved by prolonging the gating time.

It will be understood that each of the elements described above, or two or more together, may also find a useful application in other types of constructions differing from the types described above.

While the invention has been illustrated and described as embodied in a device for measuring distance with ultrasound, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Device for measuring distance with ultrasound comprising:

transmitter means for emitting a pulse-type ultrasonic signal;

reflector means positioned relative to said transmitter means so as to produce an echo signal from said pulse-type ultrasonic signal;

receiver means spaced at a distance to be measured from said reflector means so as to receive said echo signal and convert said echo signal into an electrical signal;

evaluation circuit means connected with said receiver means to determine said distance and including a threshold-value switch having a variable threshold, means for registering and evaluating an output signal of the threshold value switch for varying a switching threshold in dependence on previously registered output signals of said threshold value switch, said evaluation circuit including means for measuring a time interval between a start of said pulse-type ultrasonic signal and a time of first transgression of said echo signal across said variable switching threshold for determination of said distance.

2. Device as defined in claim 1, wherein said transmitter means and said receiver means are included in a single ultrasonic transducer.

3. Device as defined in claim 1, further comprising means for varying said switching threshold as a function of said echo signal.

4. Device as defined in claim 1, further comprising means for varying said switching threshold as a function of a differential time, said differential time being a time difference between said first transgression and a last transgression of said switching threshold by said echo signal.

5. Device for measuring distance with ultrasound comprising:

transmitter means for emitting a pulse-type ultrasonic signal;

reflector means positioned relative to said transmitter means so as to produce an echo signal from said pulse-type ultrasonic signal;

receiver means spaced at a distance to be measured from said reflector means so as to receive said echo signal and convert said echo signal into an electrical signal;

evaluation circuit means connected with said receiver means, including amplifier means for receiving said echo signal, said amplifier means having a variable gain and an amplifier output signal;

a threshold-value switch connected to said amplifier means to receive said amplifier output signal and having a fixed switching threshold, said evaluation circuit means including means for registering and evaluating an output signal of the threshold-value switch for varying a variable gain in dependence on previously registered output signals of said threshold switch, said evaluating circuit including means for measuring a time interval between a start of said pulse-type ultrasonic signal and a time of first transgression of said echo signal across said fixed switching threshold for determination of said distance.

6. Device as defined in claim 5, wherein said transmitter means and said receiver means are included in a single ultrasonic transducer.

7. Device as defined in claim 5, further comprising means for varying said variable gain of said amplifier means.

8. Device as defined in claim 7, further comprising means for varying said variable gain as a function of a differential time, said differential time being a time difference between said first transgression and a last transgression of said switching threshold by said echo signal.

9. Device for measuring distance with ultrasound comprising:

transmitting means for emitting a variable strength pulse-type ultrasonic signal;

reflector means positioned relative to said transmitting means so as to produce an echo signal from said pulse-type ultrasonic signal;

receiver means spaced at a distance to be measured from said reflector means so as to receive said echo signal and convert said echo signal into an electrical signal;

evaluation circuit means connected with said receiver means to determine said distance and including amplifier means for receiving the electrical signal, said amplifier means having a fixed gain;

said evaluation circuit means including means for registering and evaluating an output signal of said threshold value switch for varying the strength of said pulse-type ultrasonic signal in dependence on previously registered output signals of said threshold value switch, said evaluating circuit also including means for measuring a time interval between a start of said pulse-type ultrasonic signal and a time of first transgression of said echo signal across said fixed switching threshold for determination of said distance.

10. Device as defined in claim 9, wherein said transmitting means and said receiving means are combined in an ultrasonic sensor and further comprising means for gating said ultrasonic sensor with at least one gating pulse of variable duration so as to vary a transmission intensity of said pulse-type ultrasonic signal.

11. Device as defined in claim 10, wherein said means for gating produces two of said gating pulses, and further comprising means for spacing said gating pulses so that said transmission intensity decreases.

12. Device as defined in claim 11, wherein said evaluation circuit means includes processor means and said spacing of said gating pulses is determined by said processor means.

13. Device as defined in claim 12, wherein said processor means has simulation means for the determination of said spacing.

14. Device as defined in claim 13, wherein said simulation means has means for modelling said ultrasonic sensor as a linear time-independent system, means for determining a Green function of said linear time-independent system and means for convolution of said gating pulses with said Green function to obtain an output signal.

* * * * *